(12) United States Patent
Reast

(10) Patent No.: US 8,342,487 B2
(45) Date of Patent: Jan. 1, 2013

(54) ANTI-ROLL LEAF SPRING SUSPENSION

(75) Inventor: John Bolland Reast, Saxmundham (GB)

(73) Assignee: Standens Ltd., Calgary, Alberta (CA)

( * ) Notice: Subject to any disclaimer, the term of this patent is extended or adjusted under 35 U.S.C. 154(b) by 558 days.

(21) Appl. No.: 12/683,187

(22) Filed: Jan. 6, 2010

(65) Prior Publication Data

US 2010/0171250 A1    Jul. 8, 2010

Related U.S. Application Data

(63) Continuation-in-part of application No. 10/552,420, filed as application No. PCT/GB2004/000148 on Jan. 19, 2004, now Pat. No. 7,665,716.

(51) Int. Cl.
*F16F 1/24*    (2006.01)

(52) U.S. Cl. .............. 267/37.1; 280/124.17; 280/171; 267/188; 267/192; 267/361; 267/246

(58) Field of Classification Search ............... 267/188, 267/192, 361, 246; 280/124.17, 171
See application file for complete search history.

(56) References Cited

U.S. PATENT DOCUMENTS

| | | | | |
|---|---|---|---|---|
| 157,551 A * | 12/1874 | Soper | ............................ | 267/260 |
| 162,027 A * | 4/1875 | Caffrey | ......................... | 267/260 |
| 1,441,515 A * | 1/1923 | Mcgowen | .................... | 280/269 |
| 2,194,397 A * | 3/1940 | Klavik | .................... | 280/124.143 |
| 2,485,434 A * | 10/1949 | Cynamon et al. | ............. | 180/345 |
| 2,859,976 A * | 11/1958 | McFarland | .................... | 280/104 |
| 3,711,079 A * | 1/1973 | McJunkin, Jr. | ............... | 267/188 |
| 4,218,072 A * | 8/1980 | Wallis | .................... | 280/124.107 |
| 4,281,850 A * | 8/1981 | Studer | .................... | 280/124.106 |
| 4,621,834 A * | 11/1986 | Aubry et al. | ........... | 280/124.165 |
| 5,507,516 A * | 4/1996 | Reast | .................... | 280/124.106 |
| 5,813,698 A * | 9/1998 | Spoto et al. | ............ | 280/124.106 |
| 6,428,025 B1 * | 8/2002 | Suh | .................... | 280/124.106 |
| 7,213,825 B2 * | 5/2007 | Hitt et al. | ............... | 280/124.163 |

* cited by examiner

*Primary Examiner* — Robert A Siconolfi
*Assistant Examiner* — James Hsiao
(74) *Attorney, Agent, or Firm* — Kyle R. Satlerthwaite; Ryan W. Dupuis; Ade & Company Inc.

(57) ABSTRACT

Vehicle suspension comprising a pair of leaf springs (1) located or locatable on respective opposed side of a vehicle chassis (3) and extending longitudinally thereof, and an anti-roll device (12) which is arranged to extend transversely of the vehicle chassis (3), and means (41, 42, 46) mounting opposed ends (22, 23) of the anti roll device (12) rigidly to respective ones of the pair of opposed leaf springs (1).

4 Claims, 9 Drawing Sheets

ANTI-ROLL LEAF SPRING SUSPENSION

This application is a continuation-in-part of application Ser. No. 10/552,420, which is the National Stage of International Application No. PCT/GB04/00148, filed Jan. 19, 2004.

FIELD OF THE INVENTION

This invention relates to an anti-roll leaf spring suspension of the type comprising a pair of leaf springs, with single or multiple leaves, which extend longitudinally of a vehicle chassis on opposed sides thereof and which are connected to respective ends of anti-roll means, such as an anti-roll bar or tube, extending transversely of the vehicle chassis.

BACKGROUND OF THE INVENTION

When a vehicle travels over a road surface, the major mass of the vehicle is isolated, by its suspension, from vibrations caused by irregularities of that surface. The loads to which the vehicle suspension is subjected, are borne by the leaf springs of the vehicle suspension.

The softer the vehicle leaf springs, and/or the lower their load deflection rates are, the better the isolation.

The quality of this isolation affects the ride quality of the vehicle and any damage inflicted on the road surface thereby.

There is, however, a limitation on the degree to which the leaf springs can be softened, because the suspensions also have to control the dynamic forces exerted upon them by the mass of the vehicle during changes of direction and/or velocity thereof.

One such direction change occurs when a vehicle changes its direction of travel when being driven around, say, a curve or bend in the road.

During this manoeuvre, the vehicle suspension has to accommodate the centrifugal forces which cause the mass of the vehicle to transfer on to the wheels on the outside of the curve or bend and from the wheels on the inside of the curve or bend.

This mass transfer on to the outside wheels of the vehicle is transmitted to the suspension. The softer the suspension, the more the leaf springs will deflect, thus causing the vehicle to lean or roll.

Owing to the practicalities associated with the design and installation of such a suspension, as well as other dynamic vehicle handling characteristics, there is a limit to the amount and rate of roll which is acceptable. Such a limitation creates a compromise between the ride and handling qualities of the vehicle.

With such a compromise, the amount and rate of roll which is acceptable, limits the softness of the suspension and the associated quality of ride which is available.

To improve or resolve this compromise, additional springs or spring modifications, have been available, which resist vehicle roll, without increasing the vertical spring stiffness, when both vehicle wheels deflect together.

Such mechanisms are usually known as "anti-roll mechanisms".

However, as the vehicle ride is also dependent upon the vibrations to which the suspension is subjected when only one wheel of the vehicle deflects, there is often a limit as to how much the ride and handling compromise can be extended.

For many years, anti-roll mechanisms have been based upon a separate torsion bar or tube acting transversely of the vehicle between the opposed wheels of the suspension.

A recent development for vehicles which are suspended by leaf springs on each side thereof, have been mechanisms which stiffen the springs internally, only when the springs deflect in opposite directions, as they do when the vehicle rolls.

Leaf springs to which a vehicle chassis is mounted, are effectively pin-jointed beams and set as such. Usually, the leaf springs are fastened to the axle of the wheels in the region of their centres and are mounted to the vehicle chassis via bushes and/or shackles at their respective opposed ends.

The loads applied to the leaf springs create bending moments therein, which, in turn, cause the springs to deflect and, thus, absorb energy.

During vehicle roll, the effective mass of the vehicle is transferred, at the axle, from one spring to the other, changing the bending moments therein. The stiffness of the leaf springs controls the change in deflection of each spring and these now different deflections in each spring, on each side of the vehicle, create, in turn, the amount of roll in the vehicle.

In previous developments of these anti-roll techniques, a torsionally rigid member has been connected between the leaf springs at or adjacent one end of the springs. This member, such as an anti-roll bar or tube, allows the leaf springs to work normally when they deflect together in the same direction, as they normally function when creating the vehicle's primary ride characteristics.

As discussed above, when the vehicle rolls, the leaf springs deflect in different directions as the vehicle mass is transferred to the outside spring from the inside spring. During such deflections, the torsionally rigid member resists the angular differences between the two opposed leaf springs, thereby creating a deflection resisting moment in the springs, which then produces a lower change in bending moment in the springs. This, in effect, changes the pin-jointed beam nature of the springs into fixed-ended, or encastre, beams.

This lower-than-previous change in bending moment creates smaller spring deflections and thus stiffens the springs during roll only.

Therefore, adding the torsionally stiff member to the ends of the leaf springs, creates an effective anti-roll mechanism.

In practice, this additional bending moment is applied over the physical length of the brackets mounting the torsionally rigid member to the ends of the opposed leaf springs.

Also, it can be seen that this anti-roll mechanism reduces the maximum, and any change in the, bending moment and, therefore, increases the service life of the leaf springs.

In practice also, this mechanism is more effective as an anti-roll mechanism than suggested above. If the torsionally rigid member is added to just one end of the pair of opposed leaf springs, the resultant anti-roll mechanism stiffens just one end of the leaf springs when the vehicle rolls. This creates asymmetrical cantilever deflecting leaf springs, which means that, during vehicle roll, the axle seat area of each leaf spring, which is fastened centrally to the axle, attempts to deflect in different angular directions. Such deflection is resisted by the torsional rigidity of the axle which, again, tends to stiffen-up the leaf springs. This anti-roll stiffness associated with asymmetrical springs is well known in spring and suspension design practice.

Whilst this anti-roll stiffening of the leaf springs can be very effective, some applications can benefit from even higher and extra spring stiffening for resisting vehicle roll. This could allow the normal ride stiffness to be lowered even further, thus improving the basic vehicle ride and creating an even better compromise between ride quality and anti-roll vehicle handling stability.

To summarise current prior art anti-roll suspension designs, it is normal practise to mount the torsionally rigid member as close as possible to the neutral axis in bending of the leaf springs.

Also, the mountings between the torsionally rigid member and the opposed leaf springs are made sufficiently flexible to allow for the transmission of torque created by the member but to be considered pin-jointed in plan view.

This is achieved by making the brackets mounting the opposed ends of the torsionally rigid member to the ends of the leaf springs, sufficiently narrow or otherwise flexible, to allow the member to move within those mountings.

This is considered to be normal practice to improve assembly, reduce local stresses, create a lightweight structure and avoid interfering with the normal spring deflections.

It is an object of the present invention to provide a leaf spring suspension which provides, during roll of the associated vehicle, further stiffening of the springs beyond that achieved to date, as discussed above, to improve the anti-roll characteristic of the suspension and, as a consequence, its performance and durability.

SUMMARY OF THE INVENTION

Accordingly, the invention provides a suspension for a vehicle, comprising a pair of leaf springs located or locatable on respective opposed sides of a vehicle chassis and extending longitudinally thereof, and an anti-roll device which is arranged to extend transversely of the vehicle chassis, and means mounting opposed ends of the anti-roll device rigidly to respective ones of the pair of opposed leaf springs.

Preferably, the mounting means is arranged to clamp the opposed ends of the anti-roll device rigidly to respective ones of the pair of opposed leaf springs.

This rigid clamping or other form of mounting effectively renders the mounted end of the anti-roll device fixed or so-called "encastre" in bending, when viewed in plan, thereby exploiting the anti-roll device's bending stiffness to create higher anti-roll stiffening of the leaf springs.

The anti-roll device may have its opposed ends mounted rigidly by the mounting means to any position along the lengths of the pair of opposed leaf springs, although at least one end of those leaf springs is preferred.

The rigidity of the mounting of the anti-roll device to the leaf springs, as provided by the clamping or other mounting means, creates a higher resistance force to bending of the anti-roll device, in plan view, which occurs when the leaf springs deflect in opposite directions during, say, vehicle roll. This higher-than-previous resistance force creates a bending moment in the leaf springs when it acts offset from the neutral axis in bending of the springs, which resists the change in bending reducing, in turn, leaf spring deflection during vehicle roll. Thus, the extra bending rigidity stiffens the springs during vehicle roll and creates this extra anti-roll resistance within the suspension.

The opposed ends of the anti-roll device may be offset from the neutral plane in bending of each of the opposed leaf springs by means of spacers.

In a preferred embodiment to be described hereinbelow, the mounting means provides a comparatively large clamping area, which has previously been comparatively small, between the mounting means and the anti-roll device.

The anti-roll device itself may be of any suitable form, for instance, a beam, bar or tube.

According to another aspect of the invention, there is provided a method of increasing spring stiffness during vehicle roll, in which leaf springs extending longitudinally of a vehicle chassis on opposed sides thereof deflect in different directions, the method comprising mounting opposed ends of an anti-roll device that extends transversely to the vehicle chassis to respective ones of the leaf springs so rigidly as to prevent any and all relative movement of the opposed ends of the anti-roll device to the respective ones of the leaf spring to make the anti-roll device into a fixed ended characteristic beam in plan view such that when the springs deflect in different directions to each other, as in vehicle roll, the springs change from pin-jointed beams towards fixed ended characteristic beams, thus substantially increasing the stiffness of the springs.

According to yet another aspect of the invention, there is provided a method of increasing spring stiffness during vehicle roll, in which leaf springs that extend longitudinally of a chassis of a vehicle on opposed sides thereof deflect in different directions, the method comprising:

(a) mounting opposed ends of an anti-roll device that extends transversely to the vehicle chassis to respective ones of the leaf springs so rigidly as to prevent any and all relative movement of the opposed ends of the anti-roll device to the respective ones of the leaf spring to make the anti-roll device into a fixed ended characteristic beam in plan view; and (b) when the springs deflect in different directions to each other, as in vehicle roll, changing the springs from pin-jointed beams towards fixed ended characteristic beams, thus substantially increasing the stiffness of the springs.

Preferably these methods include mounting the opposed ends of the anti-roll device at a substantial offset distance from a neutral axis in bending of the springs such that when the springs deflect in opposite directions, as in vehicle roll, resistant forces combine with the offset distance from the neutral axis to create moments in the springs to further change spring bending characteristics from pin-jointed to fixed ended beam characteristics, thus further substantially increasing the stiffness of the springs.

According to an additional aspect of the invention, there is provided a method of increasing spring stiffness during vehicle roll, in which leaf springs extending longitudinally of a vehicle chassis on opposed sides thereof deflect in different directions, in use of a vehicle having opposed ends of an anti-roll device that extends transversely to the vehicle chassis mounted to respective ones of the leaf springs at a substantial offset distance from a neutral axis in bending of the springs so rigidly as to prevent any and all relative movement of the opposed ends of the anti-roll device to the respective ones of the leaf spring to make the anti-roll device into a fixed ended characteristic beam in plan view, the method comprising, when the springs deflect in different directions to each other, as in vehicle roll, (i) changing the springs from pin-jointed beams towards fixed ended characteristic beams, thus substantially increasing the stiffness of the springs, and (ii) combining resistant forces with the offset distance from the neutral axis to create moments in the springs to further change spring bending characteristics from pin-jointed to fixed ended beam characteristics, thus further substantially increasing the stiffness of the springs.

The arrangement at each end of the anti-roll device rigidly mounting the anti-roll device to the respective spring may feature U-bolts embracing around the spring and fastened to a clamping piece lying against the anti-roll device to clamp the anti-roll device and spring together with sufficient fastening tightness to retain an absolute rigidity of this clamping during in typical use conditions of the suspension. An opposing clamping piece is preferably disposed between each U-bolt and the respective spring where a closed end of the U-bolt extends about the spring.

Alternatively, straight bolts fastened tightly to the clamping piece may engage a larger opposing clamping piece on the side of the spring opposite the anti-roll device to clamp the anti-roll device and spring together between the clamping pieces, the larger clamping piece extending outwardly past opposite sides of the spring to receive passage of the bolts through it.

In a further alternative mounting arrangement at each end of the anti-roll device, support plates welded to the anti-roll device may project in a common direction from therefrom at spaced apart positions therealong to lie on opposite sides of the spring, clamping pieces being fastened to the support members to therebetween with the spring passing through the space between the clamping pieces and being held in place therebetween. A bolt may be passed through the spring and clamping pieces and be tightly fastened to ensure rigidity of the spring's clamping between the clamping pieces.

Each spring is preferably a single-leaf spring.

Alternatively, a multi-leaf spring may be used with low friction interleaves disposed between leaves of the spring and between the anti-roll device and a leaf of the spring nearest thereto to allow sliding shearing movement between the leaves under deflection of the spring, the interleaves being highly compressed between the leaves to prevent any further compression under exposure to further compression loads in use of the springs and thereby prevent any space from opening in a stack of the leaves and interleaves between the anti-roll device and a clamping piece across the spring from the anti-roll device to keep the anti-roll device rigidly clamped to the spring at a fixed position along a furthest leaf from the anti-roll device in the stack.

Cooperating matable elements at the interface of the furthest leaf and the clamping piece may positively locate the mounting arrangement at the fixed position along the furthest leaf. The cooperating elements may be a dowel pin and respective blind holes in the two members, a stud on one member and hole in the other, or a bump on one member and dimple in the other.

BRIEF DESCRIPTION OF THE DRAWINGS

In order that the invention may be more fully understood, embodiments of suspension in accordance therewith will now be described by way of example and comparison with existing prior art suspensions, with reference to the accompanying drawings in which.

DETAILED DESCRIPTION

For a better understanding of the improved anti-roll capabilities of a suspension in accordance with the invention, two known prior art leaf spring suspensions will be discussed initially.

As indicated above, leaf springs on vehicles act effectively as pin-jointed beams and are usually mounted to the vehicle axle at or adjacent their centres and to the vehicle chassis via bushes and/or shackles at their respective opposed ends.

Figure 1:
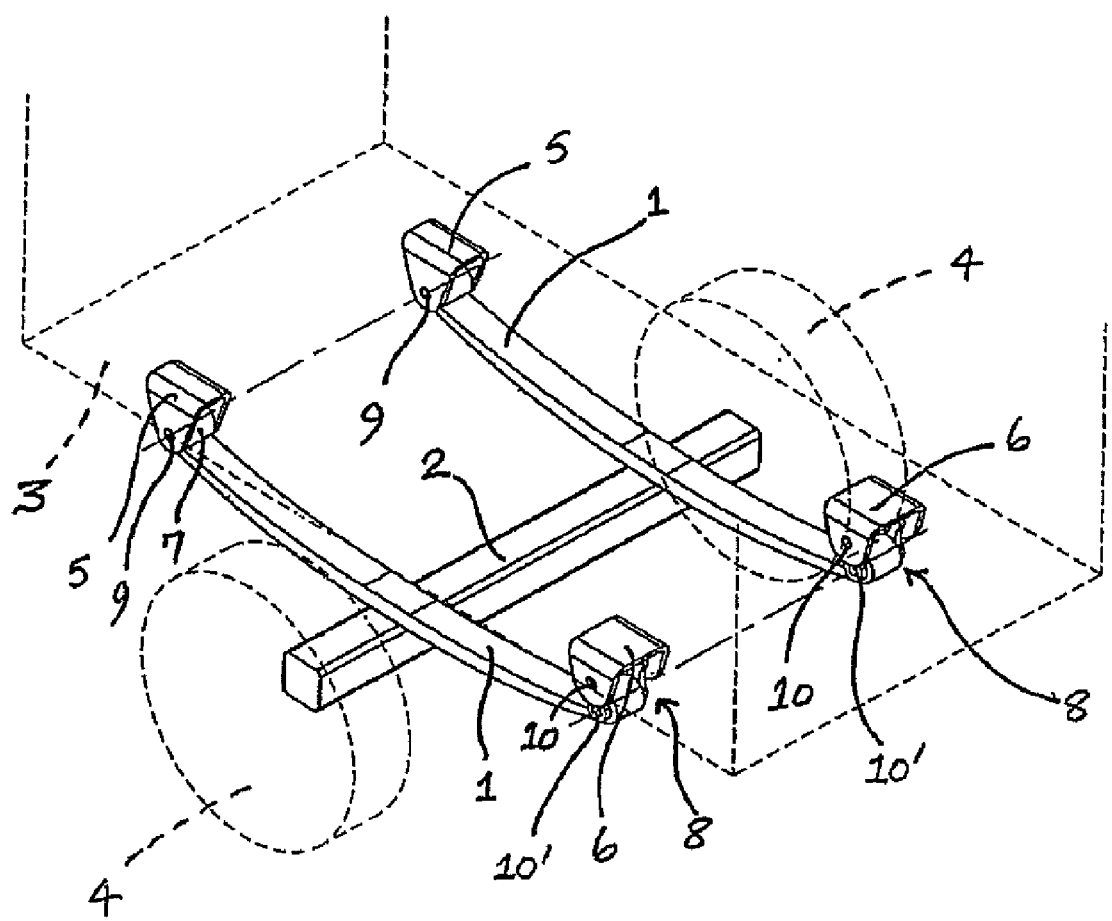
FIG. 1 is a perspective, generally diagrammatic view of a prior art leaf spring suspension without an associated anti-roll device.

Such a prior art suspension is shown in FIG. 1, wherein a pair of generally parallel leaf springs 1 are mounted, at their centres, to respective opposed end regions of an axle 2.

The leaf springs 1 extend longitudinally of the chassis 3 of the associated vehicle (not shown) and the axle has a pair of running wheels 4 at respective opposed ends thereof.

The fore and aft ends of each leaf spring 1 are mounted to the vehicle chassis 3 by respective brackets 5,6 and associated bushes 7 and shackles 8 in known manner.

Effectively, the fore and aft ends of each leaf spring 1 are pin-jointed at 9 and the lower bush 10 of the shackle 8, the upper bush 10 of each shackle 8 being shown in FIG. 1, so that the fore and aft cantilever sections of each leaf spring 1 in effect act as pin-jointed beams.

Figure 2:
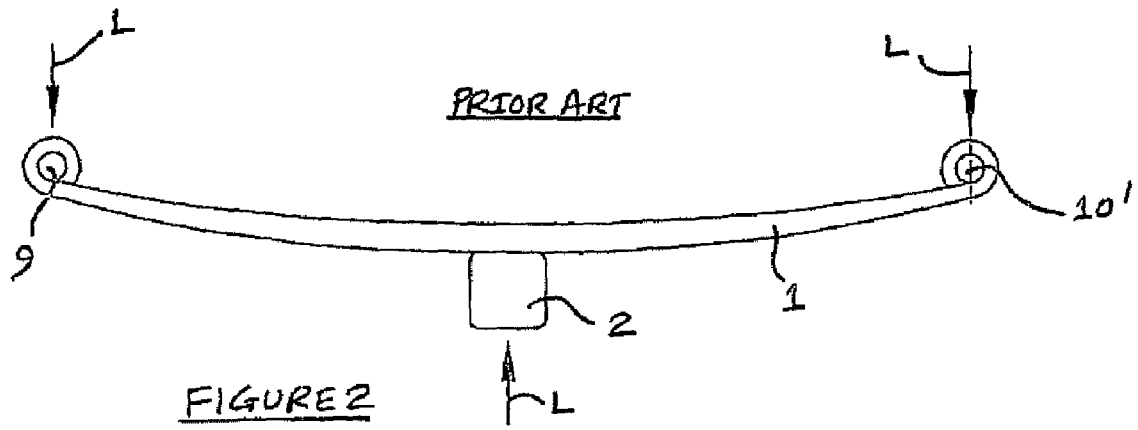
FIG. 2 is a diagrammatic side elevation of the springs of the suspension shown in FIG. 1.
Figure 3:
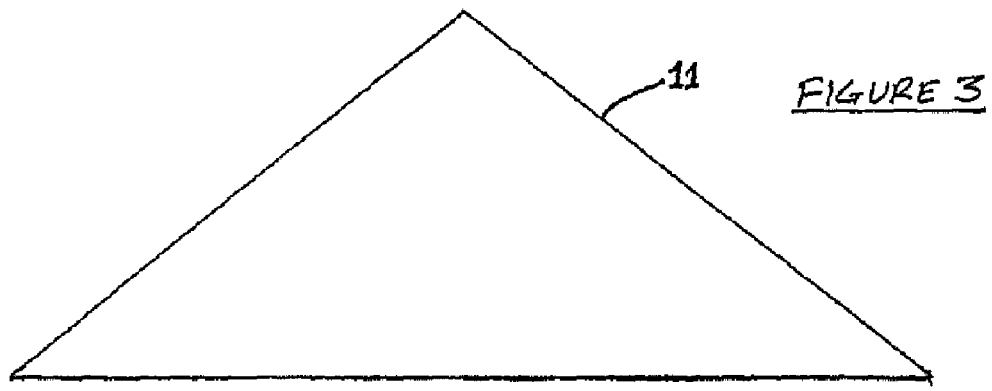
FIG. 3 is a simplistic bending moment diagram for the springs of the suspension shown in FIGS. 1 and 2.

The loads L applied to the leaf springs 1, as shown in FIG. 2, create a bending moment in each leaf spring 1, as shown in the bending moment diagram 11 of FIG. 3.

Such bending moment causes each leaf spring 1 to deflect, thereby absorbing energy during normal working of the suspension when the leaf springs 1 deflect together.

Figure 4:
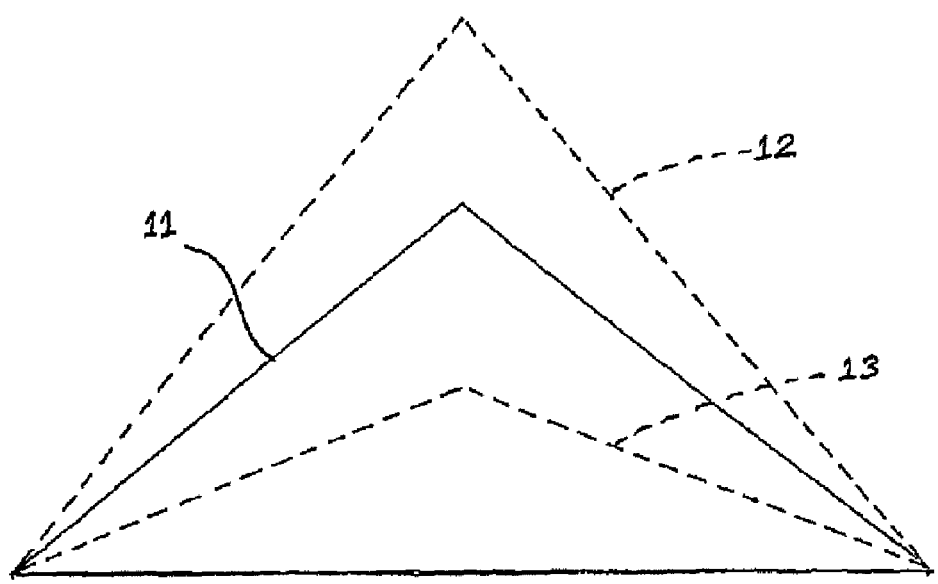
FIG. 4 is a simplistic bending moment diagram for the suspension springs shown in FIGS. 1 and 2, under vehicle roll conditions.

During vehicle roll, however, the mass of the vehicle is transferred, at the axle 2, from one spring 1 to the other, creating bending moments, as shown by the respective bending moment diagrams 12,13 of FIG. 4.

The stiffness of the leaf springs 1 controls the change in deflection of each spring 1 and these now different deflections in the springs 1, on each side of the associated vehicle, create, in turn, the amount of roll to which the vehicle is subjected.

Thus, in FIG. 4, as in FIG. 3, the steady state, bending moment diagram is represented at 11, whilst the unrestricted compression, bending moment diagram for the leaf spring 1 on the outside of a curve or bend being negotiated by the vehicle, is indicated at 12.

The unrestricted rebound, bending moment diagram for the leaf spring on the inside of the bend or curve being negotiated by the vehicle, is shown at 13.

In the development of prior art, anti-roll systems, a torsionally rigid member, such as an anti-roll bar or tube, is mounted transversely of the vehicle chassis 3, with its opposed ends mounted at or adjacent the fore and aft ends of the leaf springs 1.

Figure 5:
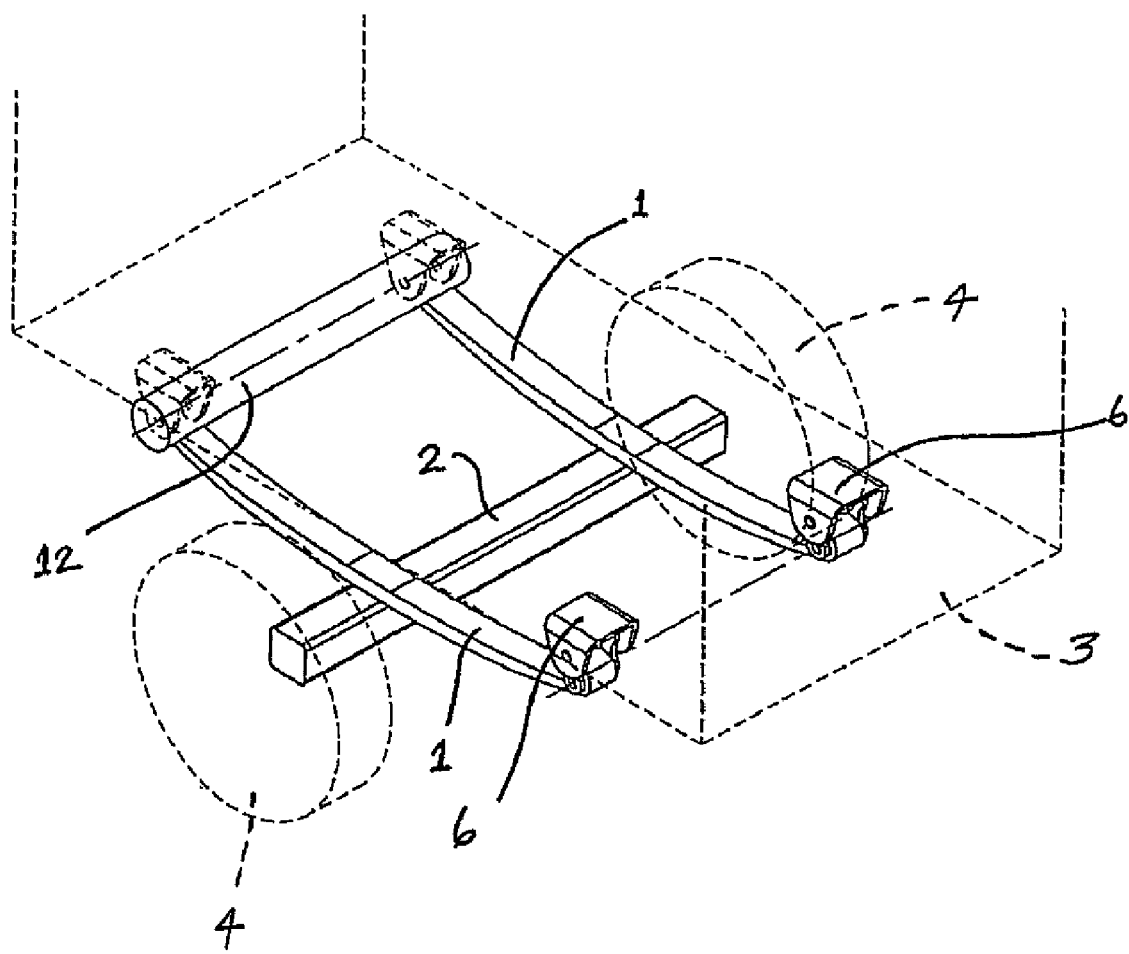
FIG. 5 is a perspective diagrammatic view of a prior art suspension fitted with an anti-roll device.

Such an anti-roll suspension arrangement is shown in FIG. 5, with the torsionally rigid member indicated at 12.

This member 12, usually in the form of a beam, bar of tube, permits the leaf springs 1 of the suspension to work normally when they deflect together in the same direction, as they function normally when creating the vehicle's primary ride characteristics.

When, however, the vehicle rolls, for example, when negotiating a bend or curve, the leaf springs 1 deflect in different directions, as the mass of the vehicle is transferred to the outside leaf spring.

During these deflections, the torsionally rigid member 12 resists the angular differences between the two leaf springs 1, creating a deflection resisting moment in the springs 1, which then produces a lower change in bending moment in the springs 1.

This, in effect, changes the pin-jointed beams, represented by the leaf springs 1, into fixed-end, or encastre, beams.

Figure 6:
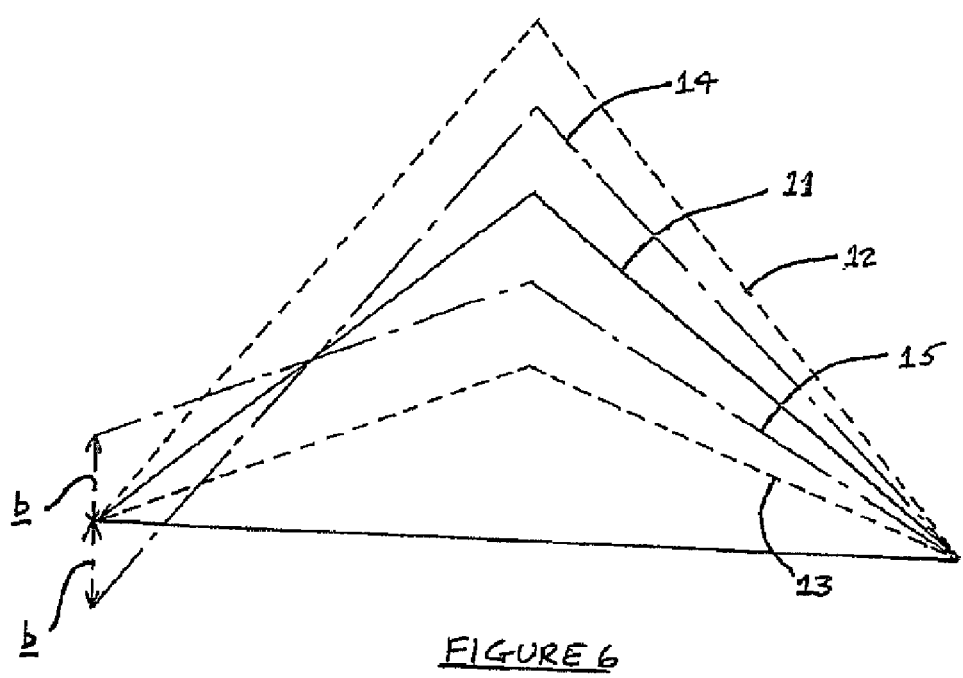
FIG. 6 is a simplistic bending moment diagram for the springs of the suspension shown in FIG. 5 under vehicle roll conditions.

This change in bending moments is illustrated in FIG. 6 in which the steady state bending moment diagram is again shown at 11, the unrestricted compression bending moment diagram, at 12 and the unrestricted rebound bending moment diagram, at 13.

The revised compression bending moment diagram resulting from the resisting moment b provided by the torsionally rigid member 12 of the suspension, shown in FIG. 5 is represented at 14, whilst the revised rebound bending moment diagram, again resulting from the resisting moment b provided by the torsionally rigid member 12, is shown at 15.

These lower changes in bending moments, as represented by the bending moment diagrams 14 and 15 in FIG. 6, create smaller-than-previous spring deflections and, thus, stiffen the leaf springs 1 during roll only.

Thus, adding the torsionally stiff member 12 to the leaf springs 1 of the suspension, creates an effective anti-roll mechanism.

For simplicity, the bending moment diagrams of FIG. 6 show the added deflection resisting moment, as if it were applied directly to the ends of the leaf springs 1. In practice, this additional moment would be applied over the physical length of the means, such as brackets, used to mount the torsionally rigid member 12 to the springs 1.

Also, it can be seen that the anti-roll device reduces the maximum, as well as change, in bending moment and, therefore, increases the service life of the springs 1.

In practice, this device is more effective as an anti-roll mechanism than suggested above.

If the torsionally rigid member 12 is mounted to just one cantilever, for example, the fore cantilever, of each leaf spring 1, as shown in FIG. 5, the effective anti-roll mechanism stiffens only one cantilever, or end, of each spring 1 when the associated vehicle undergoes roll. This creates asymmetrical cantilever deflecting springs which means that during vehicle roll, the seat area of the axle 2, which is mounted centrally of each leaf spring 1, attempts to deflect in different angular directions, this being resisted by the inherent torsional rigidity of the axle 2, again stiffening the springs 1.

This anti-roll stiffness of asymmetrical leaf springs is well known in spring and suspension design practice.

Whilst this prior art anti-roll mechanism can be effective, some applications can benefit from even higher, extra spring stiffening to resist vehicle roll. Such would allow the normal ride stiffness to be lowered even further, thus improving the basic ride when the springs 1 move together in the same direction. Such additional stiffness would create an even better compromise between ride quality and anti-roll handling stability and other characteristics.

Figure 7:
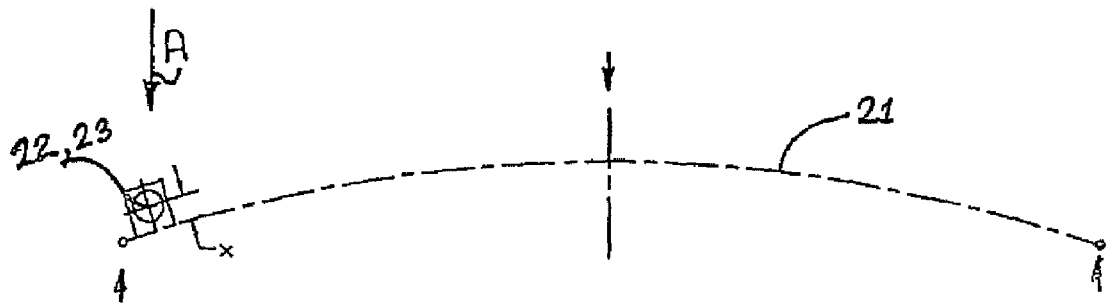
FIG. 7 is a diagrammatic side view of a suspension in accordance with the invention, in its steady state condition.
Figure 8:
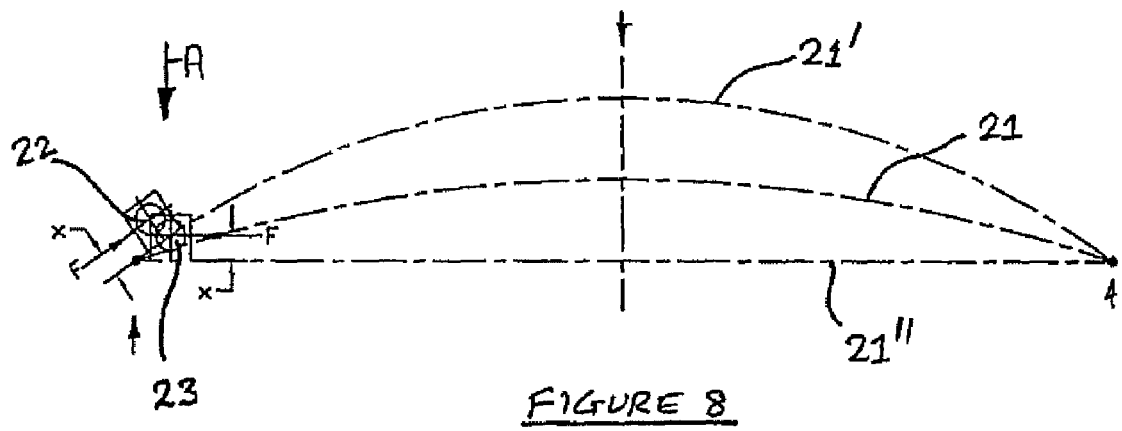
FIG. 8 is a side view of the suspension shown in FIG. 7, with its leaf springs in respective rebound and compression configuration.
Figure 9:
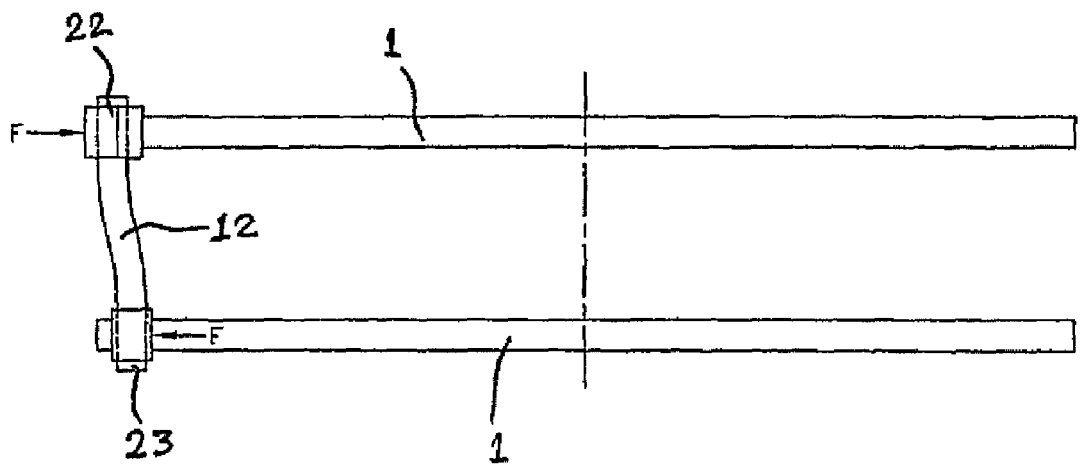
FIG. 9 is a plan view of the leaf spring suspension shown in FIG. 8, with the springs in their respective rebound and compression configurations.

Accordingly, the invention provides a leaf spring suspension which creates this better resistance to vehicle roll, such a suspension being shown diagrammatically in FIGS. 7 to 9.

As discussed above, it is normal practice with current, prior art leaf spring suspensions having an anti-roll mechanism associated therewith, to mount the torsionally rigid member 12 as close as possible to the neutral axis in bending of the leaf springs 1.

Also, those mountings are made sufficiently flexible to allow for the transmission of torque created by the torsionally rigid member 12 but to be considered as pin-jointed in plan view. This is achieved by making the brackets or other mountings for mounting the torsionally rigid member 12 to the opposed leaf springs 1 sufficiently narrow and/or flexible, to allow the member 12 to move within its mountings.

This normal suspension practice improves assembly, reduces local stresses, creates a lightweight structure and avoids interfering with the normal spring deflections.

The invention, however, provides a suspension which exploits the bending stiffness of the torsionally rigid member 12 to create higher anti-roll spring stiffening, wherein the member 12 is mounted offset from the neutral axis in bending of the leaf springs and, also, is mounted rigidly thereto. This rigid mounting effectively renders the ends of the torsionally rigid member 12 fixed, or encastre, in bending, when viewed in plan, as shown in FIG. 9.

This added rigidity creates a higher resistance force to the bending of the member 12 in a generally horizontal plane, which occurs when the leaf springs 1 deflect in opposite directions, during vehicle roll.

This higher-than-previous resistance force, when it acts offset from the neutral axis in bending of the leaf springs 1, creates a bending moment in the springs, which resists the change in bending which, in turn, reduces deflection of the springs 1 during vehicle roll. Thus, extra bending rigidity stiffens the springs 1 during vehicle roll and creates this extra anti-roll function within the suspension.

This can be more readily explained when discussed in conjunction with FIGS. 7 to 10 of the drawings.

Thus, FIG. 7 is a diagrammatic side view of the suspension in accordance with the invention, with the leaf springs 1 inverted and only their neutral axes in bending shown, in order to simplify the discussion.

To all intents and purposes, a basic leaf spring is considered to be a regularly-sectioned beam which deflects under a bending load to create a tension stress in the upper surface of the beam and a compression stress in the lower surface of the beam, the neutral axis in bending of the leaf spring being that internal layer of the beam which extends longitudinally and approximately centrally of the section of the beam, which undergoes zero (neutral) bending stress and about which the beam (leaf spring) deflects (bends) to absorb the energy caused by such deflection (bending).

Thus, in FIGS. 7 and 8, the neutral axis in bending of the leaf springs is indicated at 21, when the springs are in their steady state.

Also as shown in FIGS. 7 and 8, the opposed ends of the transversely-extending torsionally rigid member 12, shown in FIG. 9, are indicated at 22 and 23.

Also, the longitudinal axis of the torsionally rigid member 12 is offset by a distance x from the neutral axis in bending 21 of each leaf spring 1.

In accordance with the invention, the torsionally rigid member 12 has its respective opposed ends mounted rigidly to the corresponding ends of the pair of leaf springs 1, so that there is no movement therebetween, however small, during use of the suspension, particularly during vehicle roll.

In FIG. 8, the upper neutral axis in bending 21' is that of one of the leaf springs 1 in its rebound configuration, whilst the lower neutral axis in bending 21" is that of the other leaf spring 1 in its compression configuration, during roll of the vehicle.

The corresponding positions of the ends 22, 23 of the torsionally rigid member 12 are also shown in FIG. 8.

Thus, one leaf spring, on the outside of a curve or bend being negotiated by the vehicle, deflects further than the steady state, whilst the other spring, on the inside of the curve or bend, deflects less than its steady state, resulting in fore and aft movement of respective ones of the ends 22 23 of the torsionally rigid member 12, as shown in FIG. 9.

In that Figure, the view is in plan in the direction of the arrow A in FIGS. 7 and 8, with the movements of the opposed ends 22,23 of the member 12 mounted rigidly to the leaf springs 1, being evident.

The torsionally rigid member 12 can be seen to be stressed, as if it were a beam with fixed ends and with those ends moving apart, as if one was a "sinking end", as defined in applied mechanics.

This creates forces at the ends 22,23, as shown at F in both FIGS. 8 and 9. These forces F act at a distance x from the neutral axes in bending 21', 21", of the respective leaf springs 1, thus creating moments Fx around those neutral axes in bending.

Figure 10:
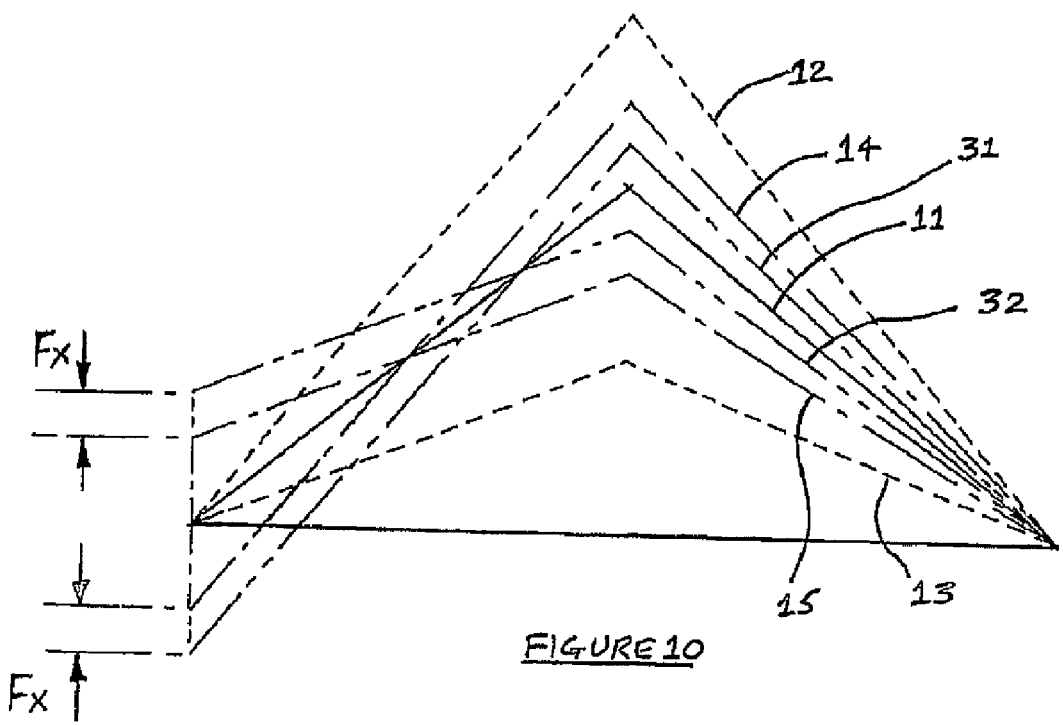
FIG. 10 is a simplistic bending moment diagram for the first embodiment of leaf spring suspension shown in FIGS. 7 to 9.

FIG. 10 is a bending moment diagram similar to that shown in FIG. 6 but with those additional bending moments added. It can be seen that those moments Fx reduce further the change in bending moment during the load changes created by vehicle roll whilst the vehicle is manoeuvring a bend or curve.

In FIG. 10, the steady state bending moment diagram is again indicated at 11, whilst the unrestricted compression and rebound bending moment diagrams for the prior art suspension without an anti-roll mechanism, as shown in FIG. 1, are indicated at 12 and 13 and with an anti-roll mechanism, as shown in FIG. 5, at 14 and 15.

The improved bending moment diagrams, as reduced compression and rebound bending moment diagrams, are indicated at 31 and 32.

Thus, this lower, bending moment change generated by the inventive suspension creates lower spring deflection, thus stiffening the springs 1 and reducing roll.

Figure 11:
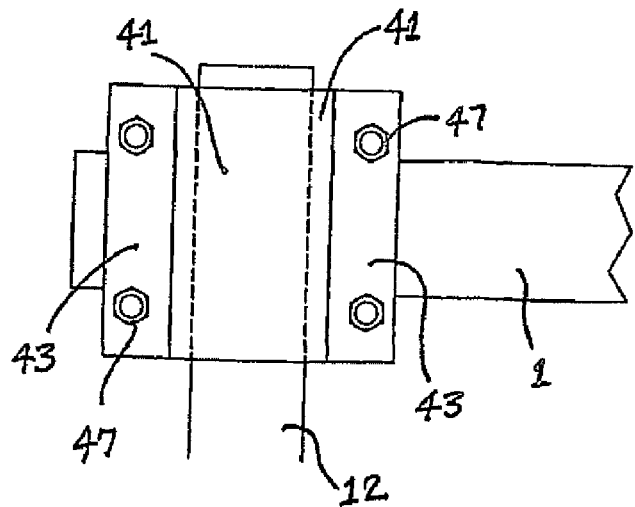
FIGS. 11 to 13 are respective plan, end and side views of a first embodiment detail of the leaf spring suspension shown in FIGS. 7 to 9, showing a first embodiment form of mounting means therefor.
Figure 12:
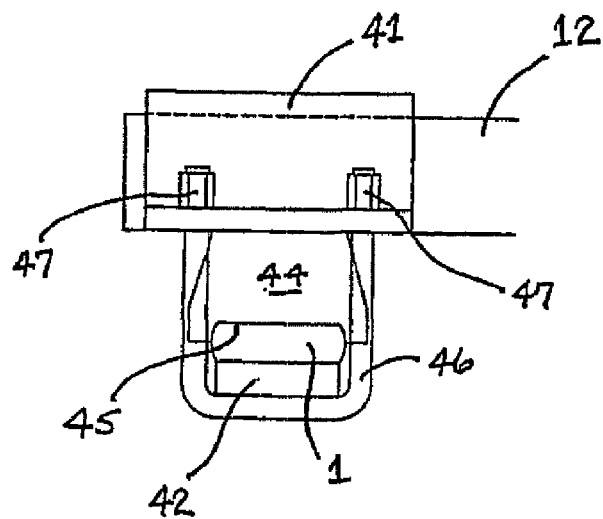
Figure 13:
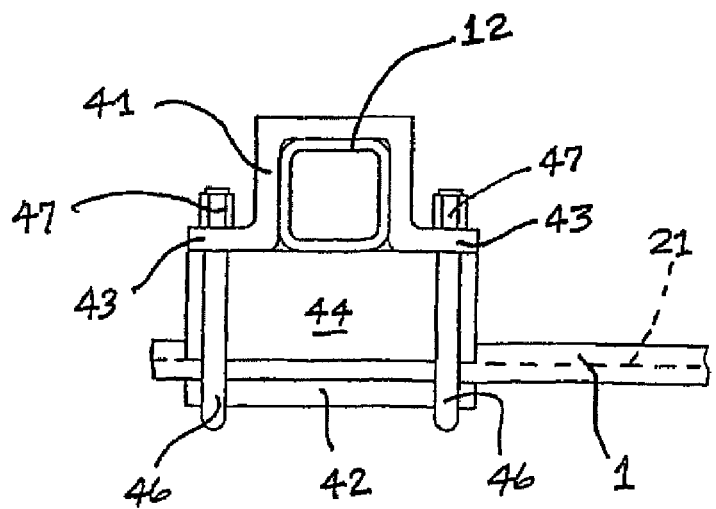

Referring now to FIGS. 11 to 13 of the drawings, here is shown a mounting arrangement between one end of the torsionally rigid member 12 and the fore end of one of the leaf springs 1.

This mounting arrangement comprises an upper, flanged, U-shaped clamp 41 and a lower, generally planar clamp 42.

The torsionally rigid member 12 which is in the form of an anti-roll tube, shown in square cross-section in FIGS. 11 to 13, is located within the channel defined by the upper clamp 41, as shown clearly in FIG. 13.

Between the lower clamp 42 and the flanges 43 of the upper clamp 41 and the anti-roll tube 12, there is provided a spacer block 44 whose lower surface is channeled at 45 to nest with the upper surface of the leaf spring 1.

The arrangement is held together by a pair of U-bolts 46 which embrace the lower clamp 42 and whose upper, otherwise free ends, extend through corresponding holes in the flanges 43 of the upper clamp 41, with securing nuts 47 being provided. The lower clamping piece better distributes the clamping force onto the clamped leaf compared to direct engagement of the U-bolts thereagainst, prevents bruising of the surface of the highly processed leaf during assembly and in service, and prevents associated localised corrosion. It also locates the spacing of the U-bolts and could be narrower to allow for a reasonable radius in the actual U-bolt with the U-bolts tight against the sides of the leaf to assist with the joint rigidity.

The neutral axis 21 in bending of the leaf spring 1 is shown in dashed lines in FIG. 13.

The mounting arrangement is clamped so tightly together by means of the U-bolts 46 and securing nuts 47 that there is no relative movement whatsoever between the anti-roll tube 12 and leaf spring 1 within that arrangement during use of the suspension under normal and roll conditions.

In this manner, and as discussed above, such an arrangement provides additional stiffening for the leaf spring 1, thus reducing roll during cornering, for example, around a bend or curve, by the associated vehicle.

This is in distinct contrast to the prior art anti-roll suspensions, wherein the mounting arrangements for the anti-roll mechanism and associated leaf springs are structured, to allow at least slight movement therebetween, particularly during vehicle roll.

Additionally, the anti-roll tube 12 is offset considerably from the neutral axis 48 in bending of the leaf spring 1, which contributes to stiffening of the spring 1 during vehicle roll.

Although a spacer 44 is provided in this particular embodiment, such a component may be omitted, as long as the anti-roll tube is offset sufficiently from the neutral axis 48 in bending of the leaf spring 1, to provide, in combination with the rigidly-clamped mounting arrangement, the additional stiffening of the spring 1 during vehicle roll.

Further, and in order to enhance the rigidity of the mounting arrangement, the clamping areas provided by the upper and lower clamps 41,42 are comparatively large when compared against the clamping areas of prior art arrangements which, as mentioned above, are usually narrow.

Thus, in this particular embodiment of inventive leaf spring suspension, the clamping area is both comparatively wide and long to provide the greatest possible area.

Figure 14:
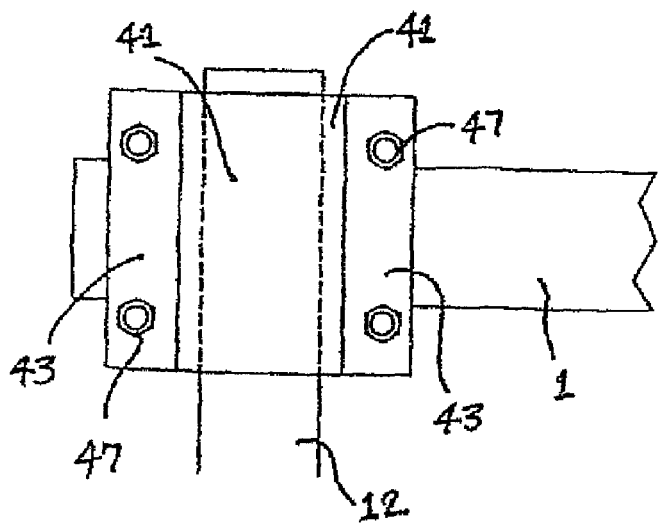
FIGS. 14 to 16 are respective plan, end and side view of a second embodiment detail of the leaf spring suspension shown in FIGS. 7 to 9, showing a second embodiment form of the mounting means therefore.
Figure 15:
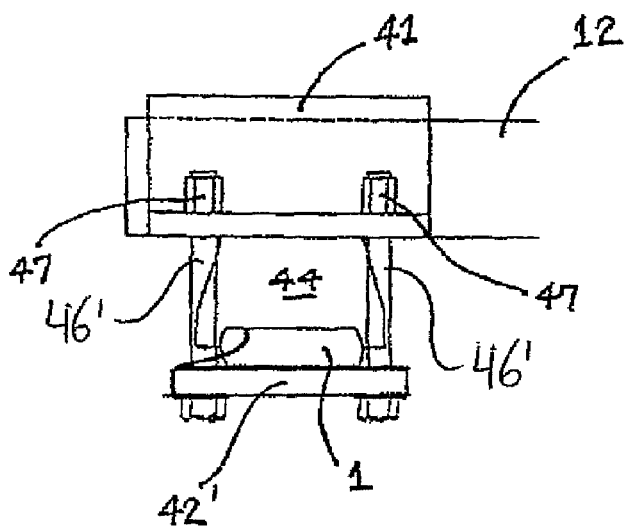
Figure 16:
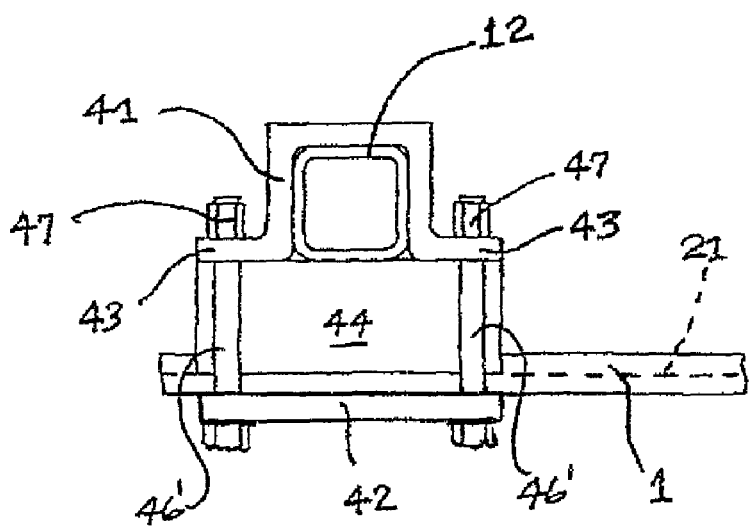

FIGS. 14 to 16 show an alternative mounting arrangement to that of FIGS. 11 to 13.

The two U-bolts 46 in FIGS. 11 to 13 are replaced by four straight bolts 46' which hold the arrangement together by clamping between the upper clamp 41 and an enlarged lower clamp 42'. The lower clamp 42 of the preceding embodiment is widened to form this larger clamp 42' projecting outward past both sides of the spring to provide mounting to the bolts which now extend through both clamps 42' and 41. The enlarged lower clamp 42' is strengthened over clamp 42 to enable the arrangement to transmit the bolt clamping forces onto the lower face of the spring 1 as the replaced U bolts 46 no longer embrace the lower clamp.

Figure 17:
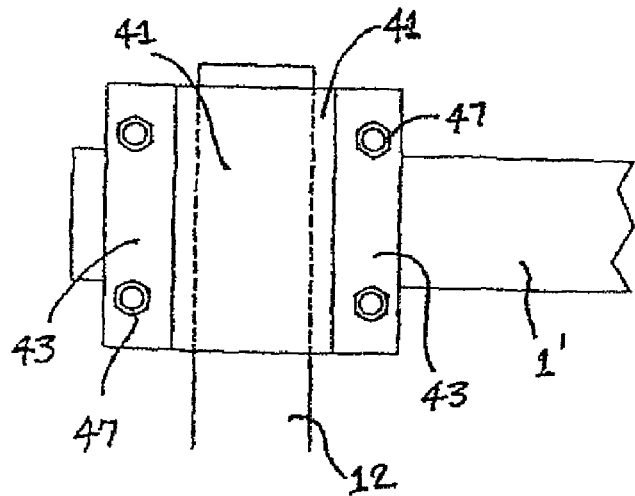
FIGS. 17 to 19 are respective plan, end and side view of a third embodiment detail of the leaf spring suspension shown in FIGS. 7 to 9, showing a third embodiment form of the mounting means therefore.
Figure 18:
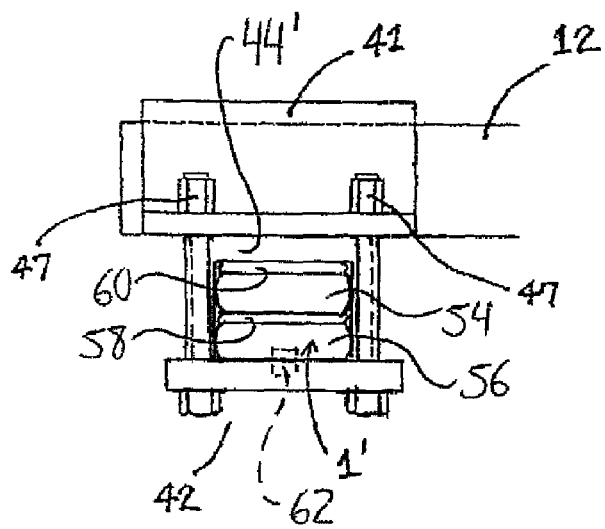
Figure 19:
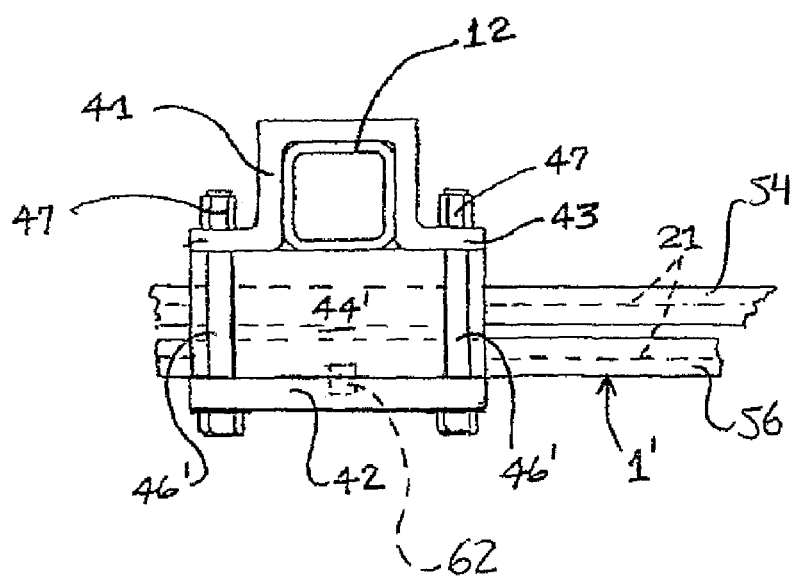

FIGS. 17 to 19 show a similar mounting means to FIGS. 14 to 16 except that a two-leaf assembly 1' replaces the single-leaf leaf spring 1. The spacer block 44 in the previous figures is extended to make a modified spacer 44', which now fully embraces the spring assembly and supports the lower clamp 42'.

In a spring assembly using more than one leaf, the leaves have to be able to move in a sliding shearing movement relative to each other along their lengthwise directions to deflect normally under a load change. This movement between the leaves needs to be in the horizontal direction of the two dimensional view shown in FIG. 19.

To create the absolute rigidity in this clamping means the upper leaf 54 in FIG. 19 is clamped between lower first leaf 56 and the top portion of the spacer 44' lying over the upper leaf using two elastomeric interleaves 58 and 60, one 58 provided between the two leaves and the other 60 between the upper leaf 54 and the spacer's top portion lying thereover. These interleaves are highly compressed until they are effectively fully bulked out with nowhere to flow further under further compression loads. This creates the absolute rigidity of the end of the anti-roll member relative the spring, but will allow the leaves to move internally relative to each other only in the required shearing action during normal spring deflection.

In this embodiment, the spacer that provides substantial offset of the anti-roll member 12 from the neutral axis 21 of each leaf of the spring also fully embraces around the top and sides of the spring leaves to provide surfaces against which the top and bottom clamp pieces press under tightening of the bolt, because where the central span of the original spacer pressed on the top face of the spring at a fixed position therealong in the single-leaf embodiment, this area between the top face of the top leaf and the central span of the spacer is now a sliding interface at the top elastomeric interleaf in the multi-leaf embodiment. Cylindrical spacers concentrically disposed around the bolts could alternatively be used in place of the full-height sides of the illustrated spacer.

The highly compressed condition of the interleaves prevents a gap from opening between the bottom leaf and the lower clamping piece under further compressive loads experienced during use of the suspension, as the maximally compressed interleaves cannot be compressed any further under such loads, and so the absolute rigidity of the clamped connection between the spring and the anti-roll member is maintained.

The plan view rigidity in this multi-leaf joint arrangement, to create the fixed ended beam bending structure, is achieved in this elastomerically interleaved structure by the frictional engagement of the lower leaf's lower face onto the lower clamping piece and the spacer that now fully envelopes both leaves and the interleaves in a tight fit against the sides of these leaves. The interleaf compression achieves a compression force, and compression force longitudinal distribution, onto the lower leaf to create the equivalent friction distribution to say the two U bolts, or 4 plain bolts, tension force. The side contact of the spacer against the leaves creates joint rigidity on both leaves, and at the same time is accurately specified to allow the shearing upper leaf movement without too much friction.

An additional feature in the illustrated multi-leaf arrangement is that the lower leaf 56 is located relative to the spacer 42' using a dowel 62. This location positions the assembly accurately onto the spring assemblies during production assembly. This location technique can be used in other clamping arrangements and can instead use a stud or a male to female dimple formed on spring and spacer. Besides assisting with the correct assembly position, these location features also prevent the lower leaf from sliding inside the clamping on any deterioration that the interleaves may experience over prolonged time in service.

Although there is movement between the spring leaves along their lengths under deflection, the torsionally rigid anti-roll member is still rigidly fixed to the overall spring, because although the top leaf is slidable relative to the bottom leaf, the clamping pieces don't move relative to the bottom leaf due to the tight clamping provided by the nuts, which is aided in the illustrated embodiment by the leaf location dowel used to initially position the components on the spring. Accordingly, using the lower leaf of the illustrated multi-leaf embodiment to define the position of the overall spring, the anti-roll device is rigidly fixed to the spring as no relative movement is allowed to occur between the clamped end of the anti-roll device and the lower leaf defining the spring's position, even though there is movement between the leaves of the spring. Accordingly, a suspension having an anti-roll device with opposite ends fixed so rigidly to opposing leaf springs of a vehicle to give the anti-roll device fixed-ended beam characteristics in plan view can be achieved by fixing each end to one leaf of the respective spring rigidly enough to prevent any and all movement of the end relative to that leaf in use of the suspension. The main clamping rigidity for the "fixed ended beam in plan" is obtained from the one leaf, but with back up from the tight side location of the spacer against all the leaves. Also, the highly clamped interleaves allow both the prior art bending resistance torque, and the new (Fx) torque, to be fully transmitted into all the leaves.

Multi-leaf embodiments in which each spring has more than two leaves may similarly be produced with the mounting arrangement for the end of the anti-roll device rigidly fixed to one of the leaves, an additional interleave member being added for each additional leaf introduced in the stack of leaves and interleaves. It will also be appreciated that the terms upper, lower, top and bottom are used in association with the illustrated orientation of the spring, anti-roll device and clamping arrangement, and that these terms are not intended to limit the manner in which the clamping arrangement may be installed. For example, the top leaf illustrated in FIGS. 17 to 19 may actually be the lower leaf when the suspension system is installed on a vehicle, the shaped clamping piece embracing the anti-roll member across the spring thickness from the opposing flat clamping piece thus being disposed below the spring instead of the illustrated position above the spring.

Figure 20:
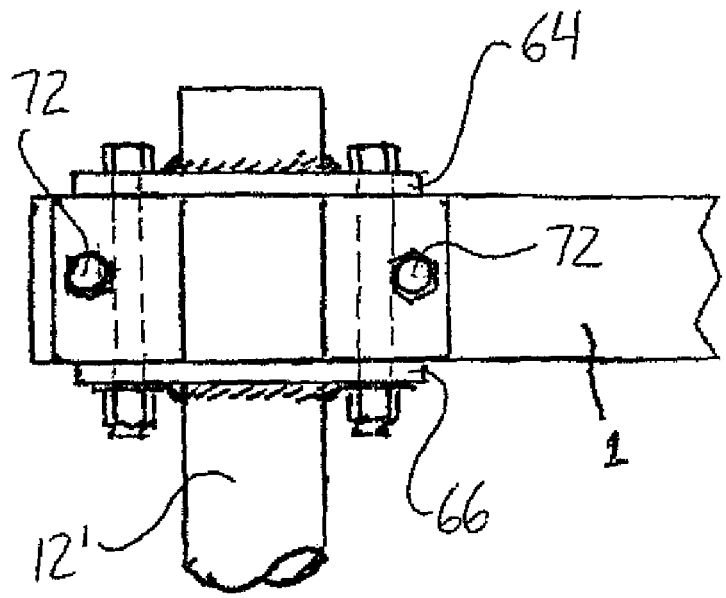
FIGS. 20 and 21 are respective plan, end and side view of a fourth embodiment detail of the leaf spring suspension shown in FIGS. 7 to 9, showing a fourth embodiment form of the mounting means therefore.
Figure 21:
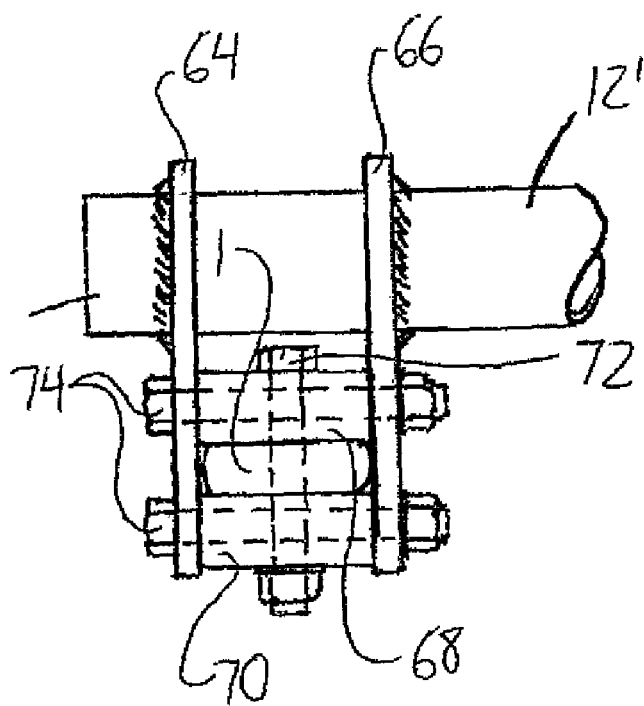

FIGS. 20 and 21 show another alternative rigid clamping arrangement means. In this arrangement two support members 64 and 66 are rigidly fastened to the torsionally rigid cross tube 12'.

These support members are shown here as two plates, but they can be replaced by other arrangements of brackets or plates. They are shown fastened to the torsionally rigid cross tube 12' using welding. Again, any structurally rigid form of fastening could be used.

The spring assembly is clamped between two clamping plates 68 and 70 using bolts 72 which pass through the spring leaf 1. While shown in this embodiment as straight bolts passing through two clamping pieces, one could instead use one or more U bolts each passing through only one clamping piece and having its closed end passing around the spring assembly across the spring from the clamping piece through which it passes and is secured to by nuts, in which case a second clamping piece again may be positioned between the closed end of the U-bolt and the spring as opposed to direct engagement of the U-bolt against the spring.

The support plates 64 and 66 fastened to the cross tube are fastened to the two clamping plates 68 and 70 using bolts 74 which pass through aligned holes in the support plates and clamping plates to extend fully over the spring in the widthwise direction thereof and clamp the whole arrangement absolutely rigid.

The different embodiments described and illustrated herein demonstrate how different mounting arrangements may be employed to clamp so tightly together that there is no relative movement whatsoever between the anti-roll tube 12 and leaf spring 1 within those arrangements during use of the suspension under normal and roll conditions, to considerably offset the anti-roll tube 12 from the neutral axis in bending of the leaf spring 1 and to provide wide and long clamping areas that are relatively large in comparison to the prior art.

The embodiment of FIGS. 20 and 21 illustrates that the significant offset used to provide, in combination with the rigidly-clamped mounting arrangement, the additional stiffening of the spring 1 during vehicle roll can be employed without necessarily using a spacer disposed between the side edges of the spring to engage against the width-defining surface thereof facing the anti-roll member.

All the suspensions discussed above in both the prior art and inventive arrangements show the additional member 12 at one end of the springs. This arrangement can also be applied to both ends of the springs, if required.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of increasing spring stiffness during vehicle roll, in which leaf springs extending longitudinally of a vehicle chassis on opposed sides thereof deflect in different directions, the method comprising mounting opposed ends of an anti-roll device that extends transversely to the vehicle chassis to respective ones of the leaf springs so rigidly as to prevent any and all relative movement of the opposed ends of the anti-roll device to the respective ones of the leaf spring to make the anti-roll device into a fixed ended characteristic beam in plan view such that when the springs deflect in different directions to each other, as in vehicle roll, the springs change from pin-jointed beams towards fixed ended characteristic beams, thus substantially increasing the stiffness of the springs: wherein the step of mounting the opposed ends of the anti-roll device to the respective ones of the leaf springs comprises using spacers to mount the opposed ends of the anti-roll device at a substantial offset distance from a neutral axis in bending of the spring such that when the springs deflect in opposite directions, as in vehicle roll, resistant forces combine with the offset distance from the neutral axis to create moments in the springs to further change spring bending characteristics from pin-jointed to fixed ended beam characteristics, thus further substantially increasing the stiffness of the springs.

2. A method of increasing spring stiffness during vehicle roll, in which leaf springs that extend longitudinally of a chassis of a vehicle on opposed sides thereof deflect in different directions, the method comprising: (a) mounting opposed ends of an anti-roll device that extends transversely to the vehicle chassis to respective ones of the leaf springs, including (i) mounting the opposed ends of the anti-roll device to the respective ones of the leaf springs so rigidly as to prevent any and all relative movement of the opposed ends of the anti-roll device to the respective ones of the leaf spring to make the anti-roll device into a fixed ended characteristic beam in plan view, and (ii) using spacers to mount the opposed ends of the anti-roll device at a substantial offset distance from a neutral axis in bending of the springs; and (b) when the springs deflect in different directions to each other, as in vehicle roll, (i) changing the springs from pin-jointed beams towards fixed ended characteristic beams, thus substantially increasing the stiffness of the springs, and (ii) combining resistant forces with the offset distance from the neutral axis to create moments in the springs to further change spring bending characteristics from pin-jointed to fixed ended beam characteristics, thus further substantially increasing the stiffness of the springs.

3. A method of increasing spring stiffness during vehicle roll, in which leaf springs extending longitudinally of a vehicle chassis on opposed sides thereof
deflect in different directions, in use of a vehicle having opposed ends of an anti-roll device that extends transversely to the vehicle chassis mounted to respective ones of the leaf springs at a substantial offset distance from a neutral axis in bending of the springs so rigidly as to prevent any and all relative movement of the opposed ends of the anti-roll device to the respective ones of the leaf spring to make the anti-roll device into a fixed ended characteristic beam in plan view, the method comprising, when the springs deflect in different directions to each other, as in vehicle roll, (i) changing the springs from pin-jointed beams towards fixed ended characteristic beams, thus substantially increasing the stiffness of the springs, and (ii) combining resistant forces with the offset distance from the neutral axis to create moments in the springs to further change spring bending characteristics from pin-jointed to fixed ended beam characteristics, thus further substantially increasing the stiffness of the springs.

4. The method of claim 3 comprising using spacers disposed between the springs and the anti-roll device to provide the substantial offset distance from the neutral axis in bending of the springs.

* * * * *